United States Patent
Frecska

(10) Patent No.: US 7,673,429 B2
(45) Date of Patent: Mar. 9, 2010

(54) SUSPENDED CEILING GRID NETWORK UTILIZING SEISMIC SEPARATION JOINT CLIPS

(75) Inventor: Sandor Frecska, Lancaster, PA (US)

(73) Assignee: Worthington Armstrong Venture, Malvern, PA (US)

( * ) Notice: Subject to any disclaimer, the term of this patent is extended or adjusted under 35 U.S.C. 154(b) by 676 days.

(21) Appl. No.: 10/592,614

(22) PCT Filed: Jan. 14, 2005

(86) PCT No.: PCT/US2005/001487

§ 371 (c)(1),
(2), (4) Date: Sep. 12, 2006

(87) PCT Pub. No.: WO2005/076792

PCT Pub. Date: Aug. 25, 2005

(65) Prior Publication Data

US 2007/0180787 A1    Aug. 9, 2007

Related U.S. Application Data

(60) Provisional application No. 60/536,427, filed on Jan. 14, 2004.

(51) Int. Cl.
*E04B 9/00* (2006.01)
*E04B 9/18* (2006.01)

(52) U.S. Cl. .............. 52/506.07; 52/167.1; 52/665; 403/187; 403/241

(58) Field of Classification Search ........... 52/506.07, 52/506.06, 506.05, 506.08, 167.1, 665, 712, 52/713, 715; 403/187, 189, 174, 178, 241, 403/247
See application file for complete search history.

(56) References Cited

U.S. PATENT DOCUMENTS

| | | | | | |
|---|---|---|---|---|---|
| 2,710,679 | A | * | 6/1955 | Bibb et al. | 403/217 |
| 2,981,386 | A | * | 4/1961 | Reske et al. | 52/657 |
| 2,990,921 | A | * | 7/1961 | Wilde | 403/178 |
| 3,089,570 | A | * | 5/1963 | O'Neil, Jr. | 52/713 |
| 3,216,537 | A | * | 11/1965 | Nelsson | 403/219 |
| 3,253,082 | A | * | 5/1966 | Buset | 174/366 |
| 3,329,387 | A | * | 7/1967 | Fischer | 248/342 |
| 4,479,341 | A | * | 10/1984 | Schuplin | 52/665 |
| 4,580,387 | A | * | 4/1986 | Rogers | 52/665 |
| 4,583,340 | A | * | 4/1986 | Sauer | 52/506.07 |
| 5,279,090 | A | * | 1/1994 | Yamaguchi et al. | 52/506.08 |
| 5,349,800 | A | * | 9/1994 | Peng | 52/506.06 |
| 5,609,007 | A | * | 3/1997 | Eichner | 52/747.1 |
| 6,029,414 | A | * | 2/2000 | MacLeod | 52/506.07 |
| 2005/0086888 | A1 | * | 4/2005 | Moore et al. | 52/506.06 |

* cited by examiner

*Primary Examiner*—Brian E Glessner
(74) *Attorney, Agent, or Firm*—Eugene Chovanes

(57) ABSTRACT

A ceiling system having a primary grid network which includes a plurality of grid members that are in generally perpendicular relation and form points of intersection. The ceiling system includes one or more joint clips, each of which is attached to the grid network at a point of intersection. Each joint clip partitions the primary grid network into smaller networks, which move independently of one another. At the same time, the appearance of an overall primary grid network is preserved.

2 Claims, 4 Drawing Sheets

SUSPENDED CEILING GRID NETWORK UTILIZING SEISMIC SEPARATION JOINT CLIPS

CROSS REFERENCE TO RELATED APPLICATION

This application claims the benefit under 35 U.S.C. §119 (e) of U.S. provisional application Ser. No. 60/536,427, filed Jan. 14, 2004, entitled "Suspended Ceiling System Utilizing Seismic Separation Joint Clips".

BACKGROUND

The invention relates to a suspended ceiling grid network which utilizes clips to connect a primary grid member to a secondary or cross grid member in generally perpendicular relationship. More specifically, the invention relates to a grid network having a clip which permits lateral movement of the cross grid member relative the primary grid member in at least two horizontal directions with respect to the ceiling plane, while maintaining the assembled relationship of the primary and cross grid members.

Clips for securing two grid members in generally perpendicular relation to one another in order to form a ceiling grid network are widely known in the art. In geographical regions subject to earthquakes, steel buildings are designed with lateral force resisting (seismic) systems to resist the effects of earthquake forces. Seismic systems make a building stiffer against horizontal forces, thus minimizing the amount of relative lateral movement and resultant damage. Although the buildings may be designed structurally to provide seismic resistance to lateral forces, suspension ceiling systems remain very susceptible to displacement under seismic conditions.

ASTM E 580-02 provides a standard practice for "Application of Ceiling Suspension Systems for Acoustical Tile and Lay-in Panels in Areas Requiring Seismic Restraint." This standard practice covers acoustical ceiling suspension systems and their additional requirement for application both in areas subject to light to moderate seismic disturbance such as Uniform Building Code (UBC) Seismic Zone 2, and areas subject to moderate to severe seismic disturbance such as UBC Seismic Zones 3 and 4. The intent of this standard practice is to provide an unrestrained ceiling system designed to accommodate the horizontal movement of the grid network when loads are applied laterally to a ceiling surface, such as during a seismic event. ASTM E 580-02 requires, in areas subject to light to moderate seismic disturbance, that the primary and cross grid members of the ceiling system, including their splices, connectors and expansion devices be designed and built to carry an average test load of 60 lbs. in tension with a 5 degree misalignment of the primary and cross grid members in any direction.

Typically, a ceiling system having a ceiling area of less than 2500 square feet, is attached to the wall via wall angles on two adjacent sides. On the other two sides, wall angles with 2 inch horizontal legs are used along with spacer bars and hanger wires. Thus, during a seismic event, the grid members abutting the wall can move laterally away from the wall, i.e. float on the 2 inch perimeter wall angle. The 2 inch wall angles provide the 5 degree misalignment of the primary and cross runners in the direction of the horizontal ceiling plane as required by ASTM E 580-02.

In order to comply with ASTM E 580-02 at an interior ceiling location, one solution that has been contemplated by those skilled in the art is to utilize primary and cross grid members having four inch horizontal flanges, in other words, two inch flanges on either side of the vertical web. This solution effectively provides the same effect as the 2 inch wall angles at an interior ceiling location. However, from an aesthetic standpoint, it is undesirable to use grid members having such wide flanges.

Additionally, the 2000 International Building Code specifies that "for ceiling areas exceeding 2,500 square feet a seismic separation joint or full height partition shall be provided." Essentially, this requires a large ceiling area to be segmented into independent smaller areas to prevent the ceiling from completely collapsing during a seismic event.

In order to comply with both ASTM E 580-02 and the 2000 International Building Code, a grid network is needed which eliminates for primary grid members having 4 inch lower flanges and which partitions a single ceiling area into smaller independent ceiling areas.

SUMMARY

The present invention is a ceiling system having a primary grid network which has a plurality of grid members disposed in generally perpendicular relation forming a plurality of intersection points. The primary grid network is partitioned into more than one grid network by attaching the joint clip of the invention at points of intersection of the grid members.

Each clip, which can be formed from a single piece of resilient sheet metal, secures first and second cross grid members to the primary grid member. The clip has a first resilient fastening portion extends in the longitudinal direction of the primary grid member and attaches to the primary grid member. The clip also has a second resilient fastening portion which extends from the first fastening portion at a right angle. The clip further includes a third resilient fastening portion which extends from the first fastening portion at a right angle on the side of the first fastening portion opposite the second fastening portion.

The joint clip of the invention partitions the primary grid network into smaller networks, or islands. Each smaller grid network is capable of moving independently of neighboring grid networks, while at the same time, preserving the aesthetic appeal of the overall grid network. The clip adds structural strength to the overall grid framework to prevent twisting and withdrawal of the cross grid members from the primary grid member.

DETAILED DESCRIPTION OF THE INVENTION

The following description of the invention is provided as an enabling teaching of the invention in its best, currently known embodiment. Those skilled in the relevant art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances and are a part of the present invention. Thus, the following description is provided as illustrative of the principles of the present invention and not in limitation thereof, since the scope of the present invention is defined by the claims.

The ceiling grid network of the invention includes a plurality of primary and cross grid members. The grid members shown throughout the drawings are of a generally inverted T-cross section, which are well known in the art. However, it should be noted that other grid members could be used in the grid network of the invention. The primary and cross grid members are typically spaced in perpendicular relation to accommodate ceiling panels and other suspended ceiling equipment, such as light fixtures. The grid network formed can be suspended from a stationary fixed ceiling.

Figure 1:
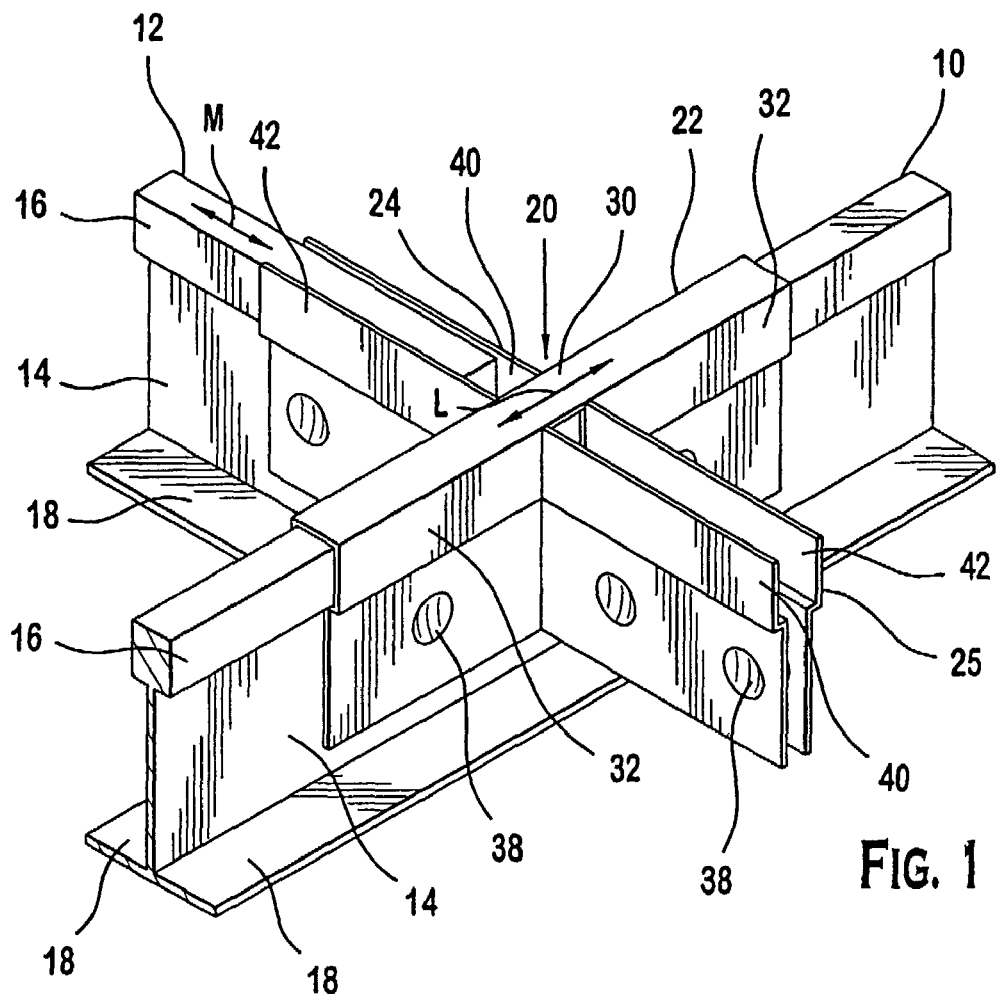
FIG. 1 is a fragmentary perspective view of the ceiling system illustrating the joint portion of the system to which an example embodiment of a clip of the invention is shown mounted.

Referring now to FIGS. 1-3 and 7, the intersection of a primary grid member and a cross grid member is shown. As shown in FIG. 1, the cross grid member 12 is disposed in generally perpendicular relation to the primary grid member 10. Each of the grid members 10,12 comprise a web 14 extending generally vertically and flange 18 extending horizontally from both sides of the vertical web 14. The vertical web 14 may include a bulb portion 16 at an end of the vertical web 14 opposite the horizontal flange 18. Although the bulb portion 16 is shown throughout the drawings as having a rectilinear cross section, the bulb can have several different configurations, such as a generally circular cross shape.

Figure 2:
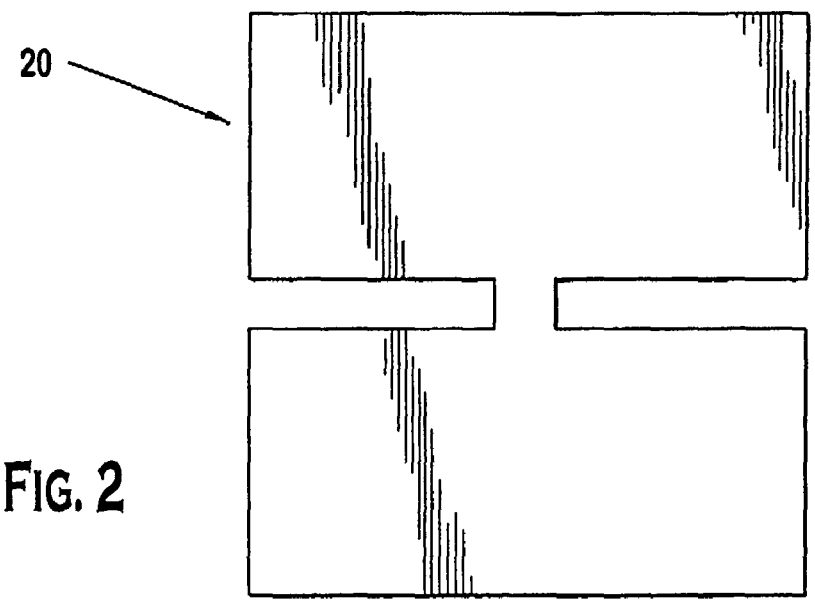
FIG. 2 is a plan view of the example embodiment of the clip shown in FIG. 1 prior to being bent into shape.

A joint clip 20 is attached to the grid network at an intersecting point of the primary 10 and cross grid members 12. In the example embodiment shown in FIG. 1, the clip 20 is formed of a single flat piece of generally resilient yet flexible material, such as spring steel material. The material may be stamped using mass production techniques well known in the art. FIG. 2 shows the clip 20 of FIG. 1 in its unbent form. When bent into its finished shape, the clip, when viewed from the top, is of general cross shape.

Figure 7:
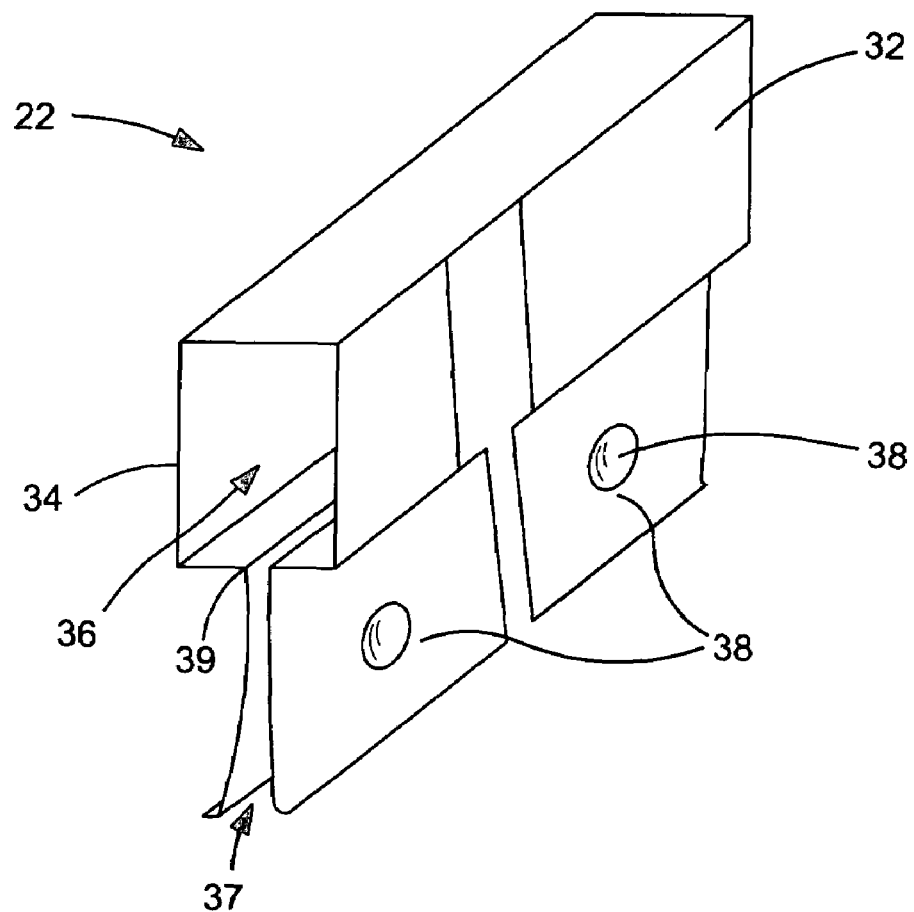
FIG. 7 is a perspective view of the first fastener portion of the clip of FIG. 1.

A first resilient fastener portion 22 of clip 20 is attached to a primary grid member 10. As best seen in FIG. 7, the first resilient fastener portion 22 has two opposing leg 32, 34 which form a downwardly opening channel 36 for straddling the vertical web 14 of a primary grid member 10. Preferably, the first fastener portion 22 is configured so that its opposed legs 32, 34 follow the geometry of the vertical web 14 of the primary grid member 10, including any bulb portion 16. If the primary grid member 10 has a bulb 16, the first fastener portion 22 can be snap-fastened to the primary grid member 10 by forcing it down over the bulb 16. The opposing legs 32, 34 can be slightly spread at the bottom to form an inverted-V channel 37 to allow easier attachment of the clip onto the primary grid member 10 having a bulb 16. The bulb 16 of different grid members 10 can vary somewhat but are typically of similar width so that a single size of downwardly opening V-shaped channel 37 should be suitable for use with most grid members.

When inserted into channel 36, the primary grid member 10 is slidably secured therein by the crimping of the resilient opposing leg portions 32,34 about the vertical web 14 of the primary grid member. The clip 20 is prevented from moving upwardly away from assembled relation by the engagement of the leg portions 32,34 with the underside of the bulb 16 of the primary grid member 10. The apex of the inverted-V channel 37 should be sufficiently tight to provide support for the underside of the bulb 16 of the vertical web 14.

Each leg portion 32, 34 may include one or more inwardly detents 38 stamped inwardly in a direction toward the opposing leg. The detents 38 further assist in engaging the vertical web 16 of the primary grid member 10 in a generally snug, gripping relationship in channel 36, thereby further resisting longitudinal movement of the primary grid member 10 in channel 36. However, during seismic activity, the primary grid member is able to move within channel 36 in a direction shown by Arrow L despite this resistance.

Each clip 20 further includes second and third resilient fastener portions, 24 and 25 respectively, also referred to as "cross grid member supports", extending from, and integrally connected to, the first resilient fastener portion 22 in generally perpendicular relation. The second resilient fastener portion 24 effectively attaches a first cross grid member 12 to the primary grid member 10. Likewise, the third resilient fastener 25 portion effectively attaches a second cross grid member 12 to the primary grid member 10.

Figure 3:
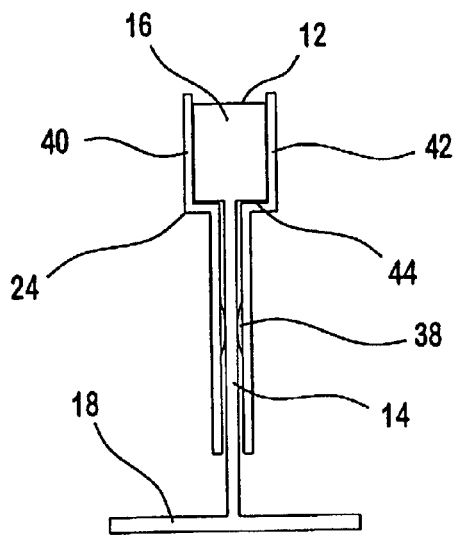
FIG. 3 is an elevation view of cross grid member inserted into the clip of FIG. 1.

Each resilient fastener 24, 25 has two opposing clip webs 40, 42 which generally follow the geometry of the web 14 (and bulb 16) of a secondary grid member 12. In this embodiment, the top of each cross tee support is open forming a channel 44 having generally a Y-shaped cross section. FIG. 3 shows cross grid member 12 received in the channel 44 of resilient fastener 24. As shown, the clip webs 40, 42 contour to the shape of the vertical web 14 and are spaced so as to provide a snug fit about the grid member 12. The grid member 12 is secured in channel 44 by the crimping of the clip webs 40, 42 about the vertical web 14.

In a conventional configuration, a cross grid member 12 it typically supported by a lower horizontal flange 18 of the primary grid member 10. Here, support for the cross grid member 12 by the primary grid member is not required as the clip webs are contoured to the underside of the bulb 16 of the secondary grid member 12. Thus, resilient fastener 24 alone can support the secondary grid member 12. This is particularly important during a seismic disturbance when cross grid member 12 is displaced in the directions shown by arrow M in FIG. 1. A clip web length of at least 2 inches is preferable in order to safely comply with ASTM E 580-02.

Each clip web 40, 42 may also include one or more detents 38 stamped inwardly in a direction toward the opposing leg. The detents 38 assist in engaging the vertical web 16 of the secondary grid member 12 in a generally snug, gripping relationship, to resist any withdrawal movement of the secondary grid member 12 from fastener portions 24 and 25. Despite this resistance, during seismic activity, the secondary grid member 12 is able to move in channel 44 in the directions indicated by Arrow M.

Figure 4:
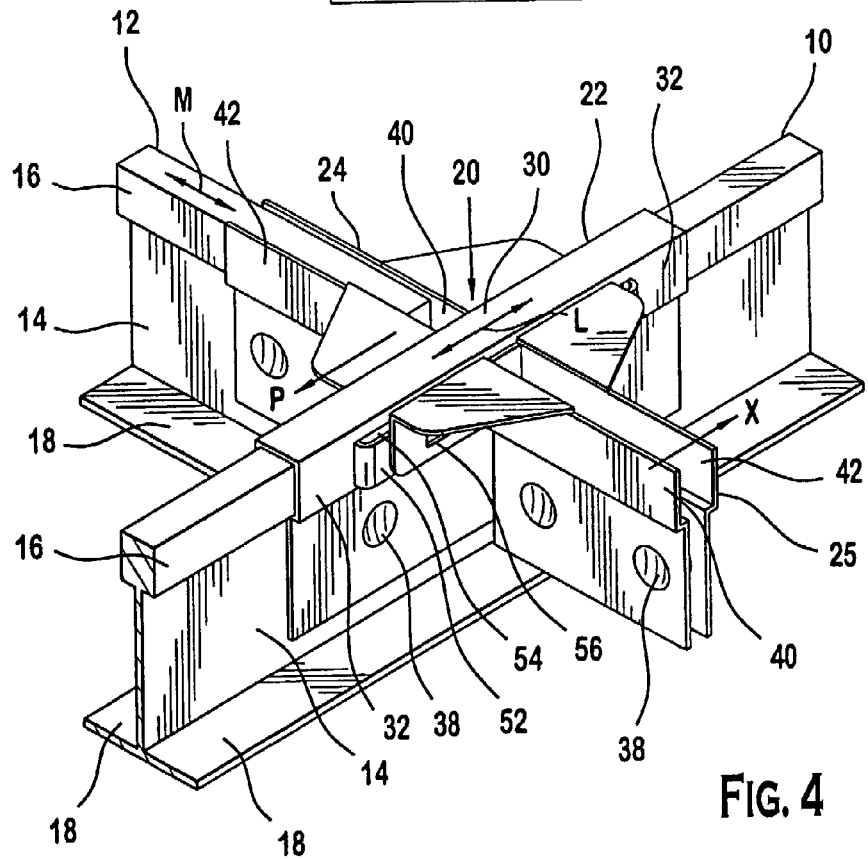
FIG. 4 is a fragmentary perspective view of the ceiling system illustrating the joint portion of the system to which an alternate embodiment of the clip of the invention is shown mounted.

Since the direction of the motion of the independent ceiling areas during an earthquake is unpredictable it may be possible that two ceiling areas, and therefore their respective cross beams, on either side of a separating primary grid member move in opposite directions lengthwise along the primary grid member, i.e. in opposite directions of the horizontal directions indicated by Arrows P and X in FIG. 4.

Figure 5:
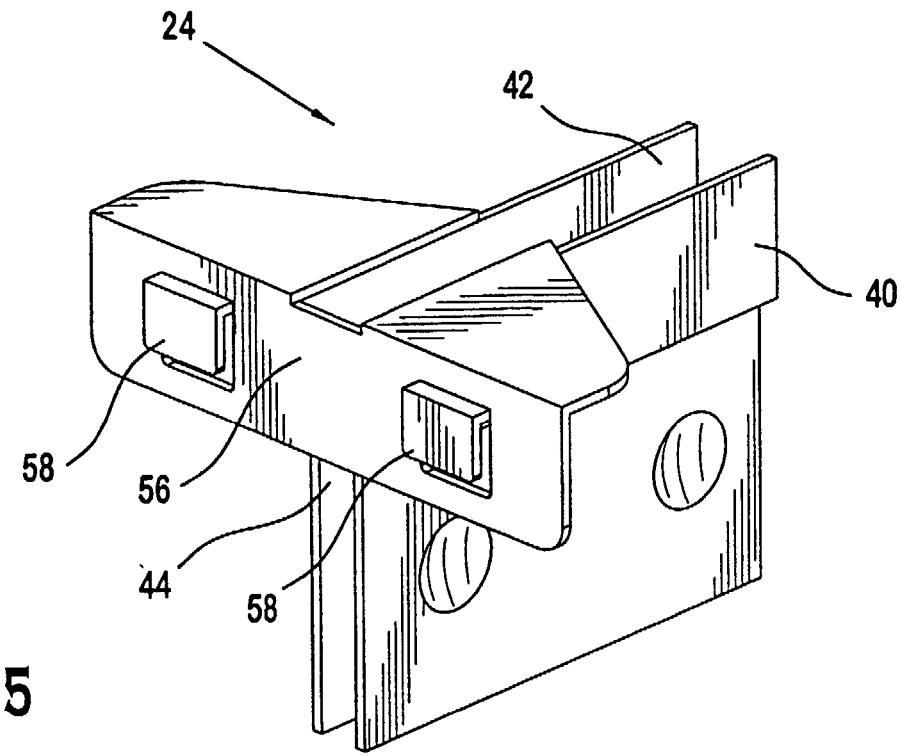
FIG. 5 is a perspective view of a cross member support portion of the clip shown in FIG. 4.
Figure 6:
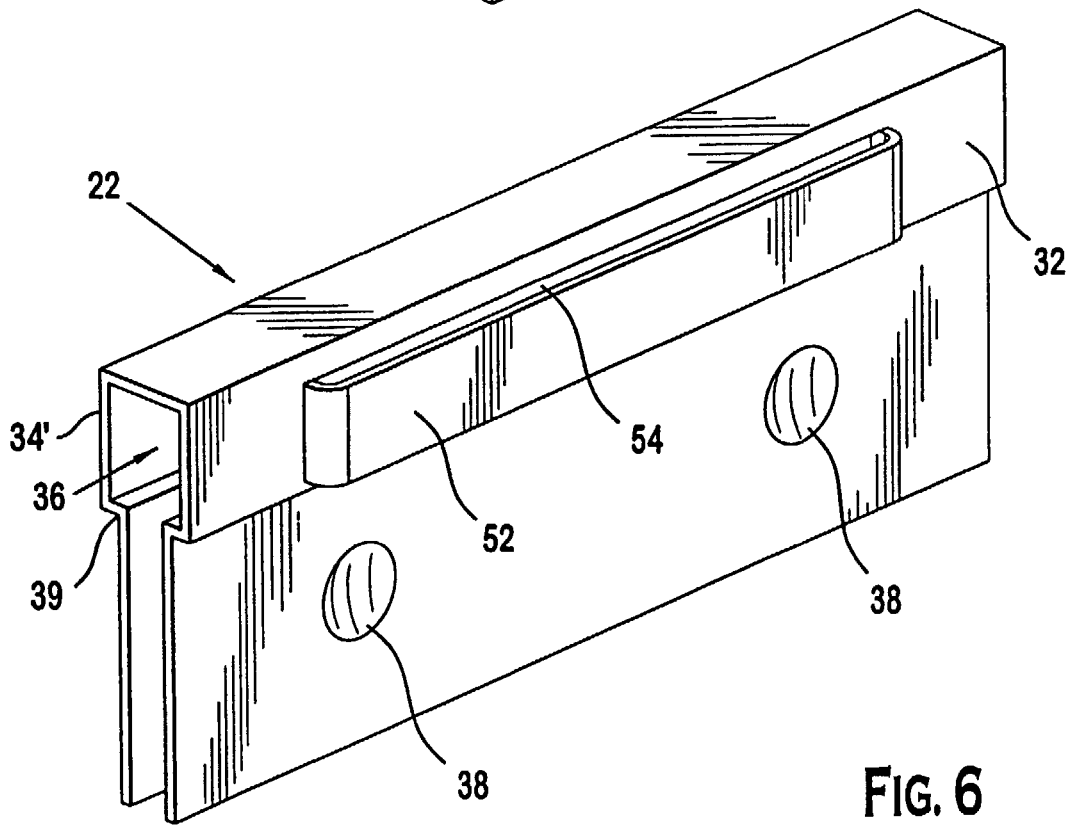
FIG. 6 is a perspective view of a main body portion of the clip shown in FIG. 4.

The example embodiment of the joint clip shown in FIGS. 4-6 permits independent motion of the secondary grid members 12 in the four horizontal directions. The key is that each cross member moves independent of one another and is not dependent on the sliding engagement of the first fastener portion to the primary grid member. In other words, the first fastener portion can be fixedly attached to the primary grid member. It should be noted that the fastening portions illustrated in the second alternative embodiment are individual components and are attached to one another to form the joint clip.

In this configuration, each opposing leg 32,34 of the first fastener portion 22 has a clip carrier 52 which is defined by a carrying slot 54 stamped in the leg of the first fastener portion 22. The second and third fastener portions 24, 25 of the first embodiment are modified to include a face plate 56. The face plate 56 integrally extends from the top of the clip webs 40,42 in a downward direction but is spaced from the side edge of the clip webs. The face plate 56 contains one or more downwardly extending planar tabs 58 stamped out of the face plate 56 with the top of the tabs 58 integrally attached to the face plate 56. The tabs 58 engage carrying slot 54 bf the first fastener portion 22. When engaged, the second or third fastener portion 24,25, and, thus, a cross grid support member 12 attached thereto, can slide along the clip carrier or track 52 in carrying slot 54, in the directions indicated by Arrows P and X in FIG. 4. As before, the cross grid member 12 retains its freedom of horizontal motion in channel 44, i.e. in a direction perpendicular to the primary grid member 10 as indicated by Arrow M.

I claim:

1. In a ceiling grid for a suspended ceiling intended for use in zones subject to earthquakes, the improvement comprising a joint clip that
   (1) in a connection in the grid between a main beam and a pair of cross beams, wherein each of the pair extends from an opposite side of the main beam,
   (2) permits, during an earthquake, the main beam and each of the pair of cross beams to move independently of one another, without transmitting horizontal forces between or among the beams;
   (3) is formed of a first segment extending over, and movable along, the main beam; and
   (4) second and third identical segments extending laterally, on opposite. sides, from the main beam, each of which slidably supports a cross beam,
wherein
   the first segment has a track on each side of the main beam, and
   (5) the second and third segments are each separately slidably supported in one of the tracks of the first segment,
whereby,
   by using one of the joint clips at connections along a selected main beam in the ceiling grid, the area in the ceiling grid on one side of the main beam is isolated from forces created in the area in the ceiling grid on the other side of the main beam, during an earthquake.

2. The joint clip of claim 1 wherein an isolated area is 2,500 ft. or less.

* * * * *